Figure 1:
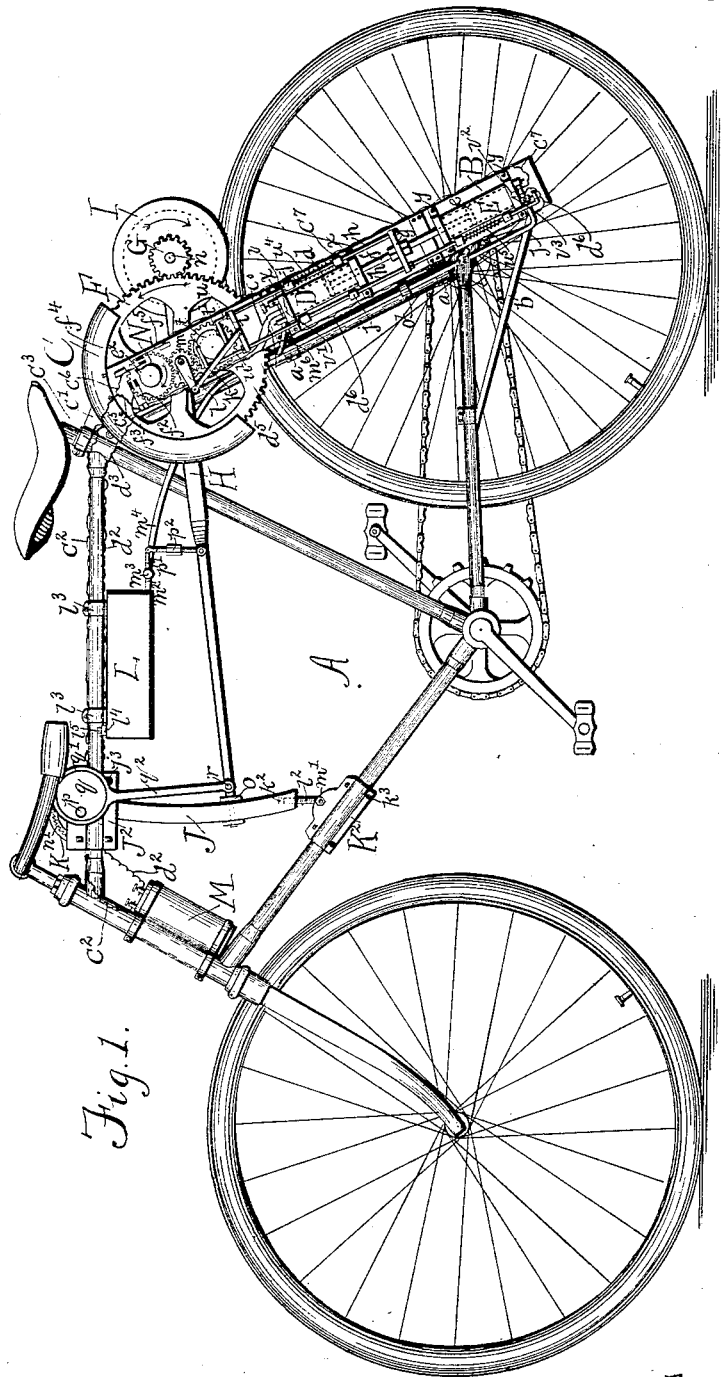

No. 633,484. Patented Sept. 19, 1899.
S. N. POND.
INTERNAL COMBUSTION MOTOR FOR BICYCLES, &c.
(Application filed Apr. 10, 1899.)
(No Model.) 4 Sheets—Sheet 1.

Witnesses:
George E. Haley
Robert N. Holt

Inventor:
Samuel N. Pond.

THE NORRIS PETERS CO., PHOTO-LITHO., WASHINGTON, D. C.

No. 633,484. Patented Sept. 19, 1899.
S. N. POND.
INTERNAL COMBUSTION MOTOR FOR BICYCLES, &c.
(Application filed Apr. 10, 1899.)
(No Model.) 4 Sheets—Sheet 2.
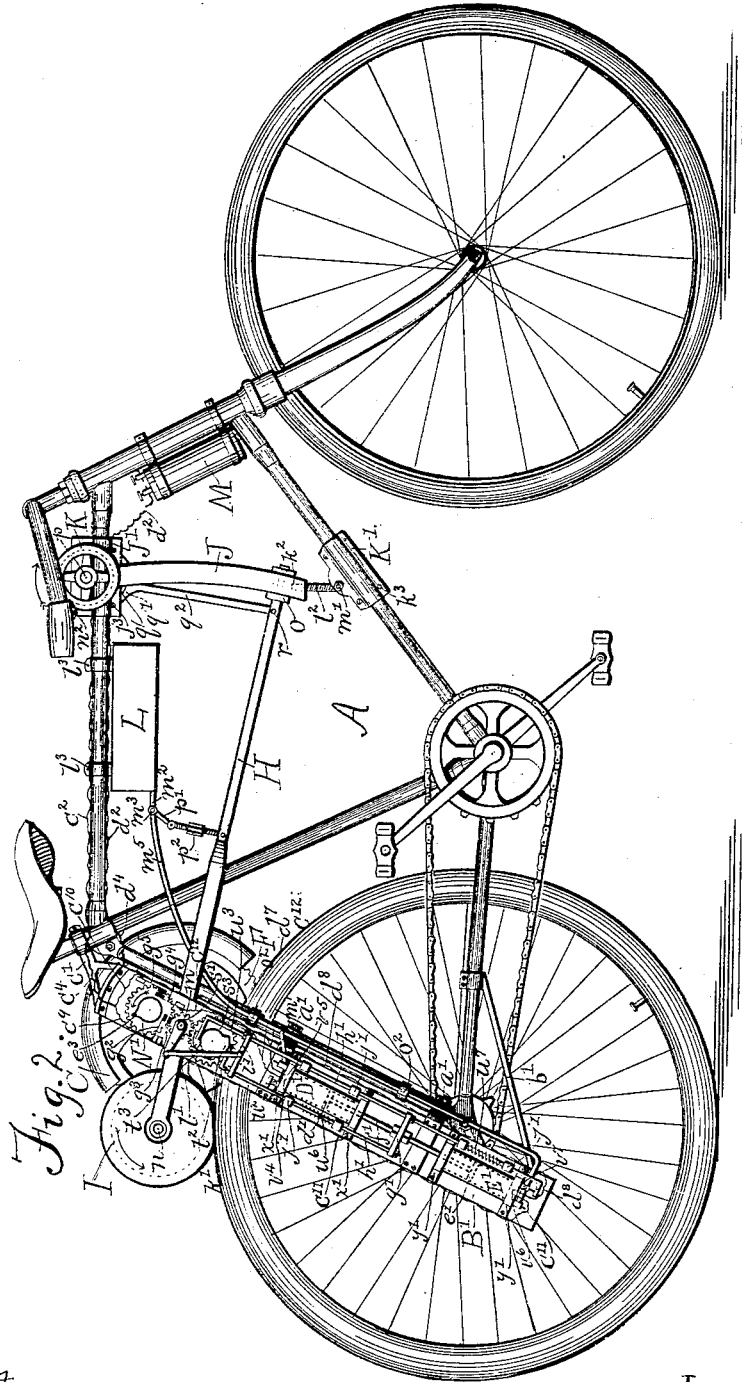
Witnesses:
George E. Haley
Robert N. Holt
Inventor:
Samuel N. Pond.

No. 633,484. Patented Sept. 19, 1899.
S. N. POND.
INTERNAL COMBUSTION MOTOR FOR BICYCLES, &c.
(Application filed Apr. 10, 1899.)
(No Model.) 4 Sheets—Sheet 3.
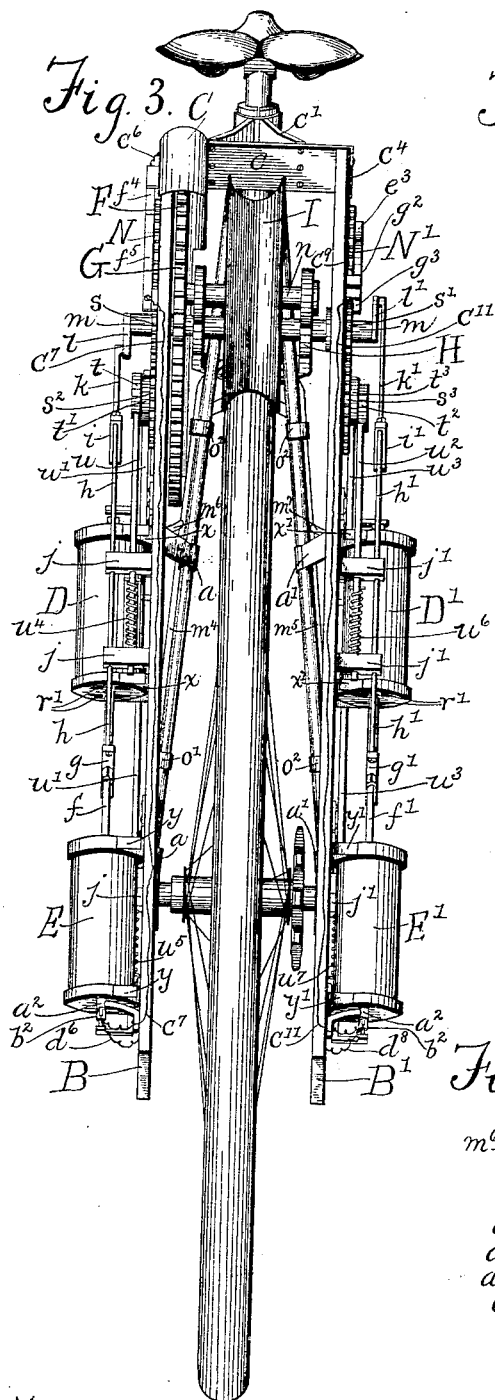
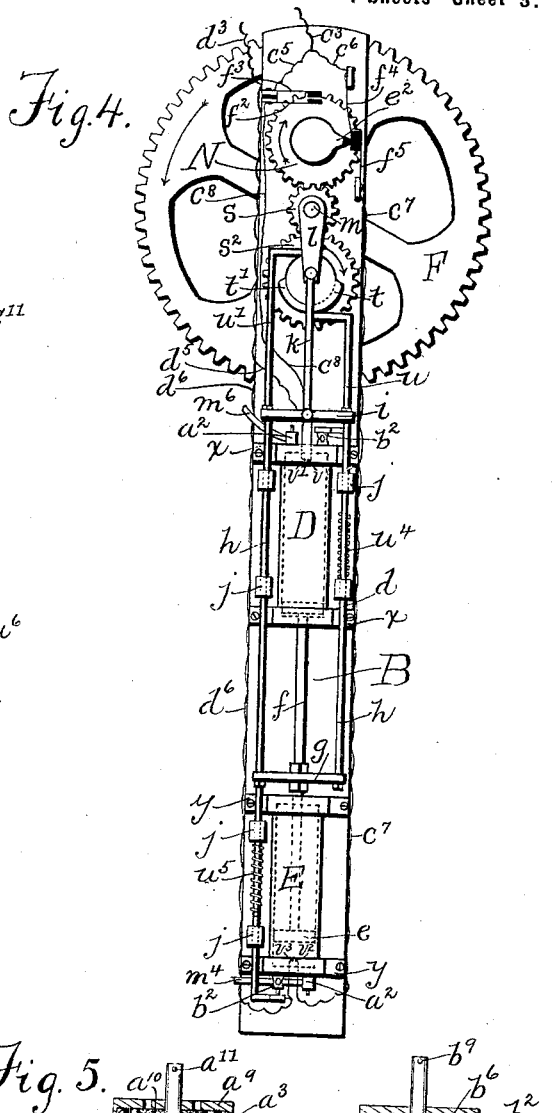
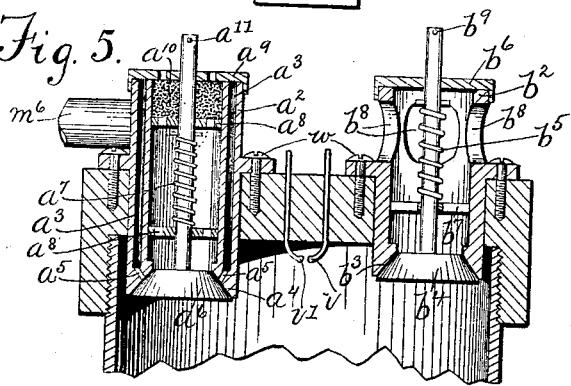
Witnesses:
George E. Haley
Robert N. Holt
Inventor:
Samuel N. Pond No. 633,484. Patented Sept. 19, 1899.
S. N. POND.
INTERNAL COMBUSTION MOTOR FOR BICYCLES, &c.
(Application filed Apr. 10, 1899.)
(No Model.) 4 Sheets—Sheet 4.
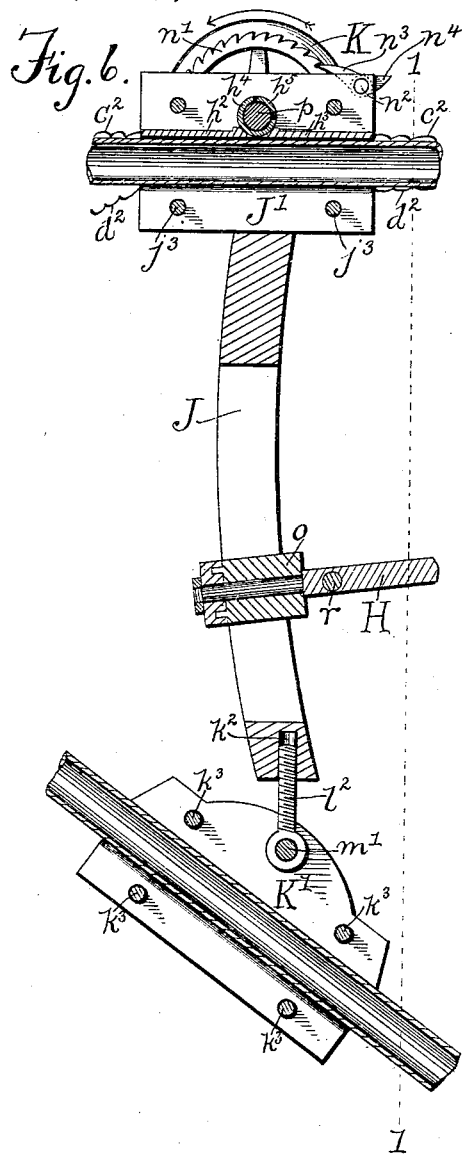
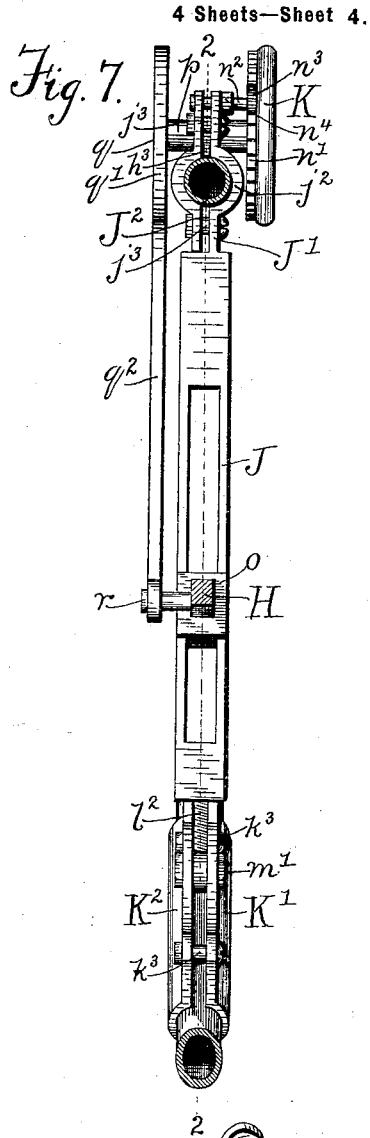
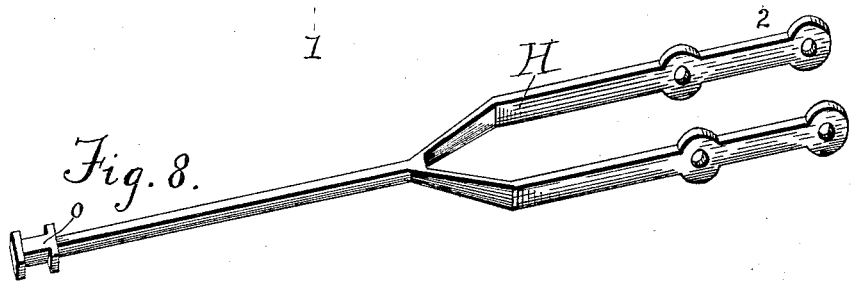
Witnesses:
George E. Haley
Robert N. Holt
Inventor:
Samuel N. Pond

UNITED STATES PATENT OFFICE.

SAMUEL N. POND, OF CHICAGO, ILLINOIS.

INTERNAL-COMBUSTION MOTOR FOR BICYCLES, &c.

SPECIFICATION forming part of Letters Patent No. 633,484, dated September 19, 1899.

Application filed April 10, 1899. Serial No. 712,386. (No model.)

*To all whom it may concern:*

Be it known that I, SAMUEL N. POND, a citizen of the United States, residing at Chicago, in the county of Cook and State of Illinois, have invented certain new and useful Improvements in Internal-Combustion Motors for Bicycles and Similar Vehicles, of which the following is a specification.

My invention relates to a new and improved motor operated by a combustible mixture of air and gas or oil-vapor and adapted to be applied to a bicycle of the ordinary type, my invention being also applicable in its broadest features to any other similar wheeled vehicle designed for the transportation of light loads.

The object of my invention is to furnish a light, inexpensive, and practicable motor which may be readily attached to and detached from a bicycle or other similar vehicle and which may at the will of the rider be instantly thrown into and out of gear with the vehicle to which it is applied.

In that class of automobile vehicles in which, in addition to the motor, manually or otherwise operated means are provided for starting or propelling the vehicle, such as the chain-and-sprocket mechanism of a bicycle, both the motor and the manually or otherwise operated means are in the majority of instances permanently connected with the driven part of the vehicle, so that when either is operated the other is necessarily actuated and by the idle operation of its parts constitutes a drag on the machine. In a smaller class of such devices, however, means have been provided for disconnecting the motor from the driven part of the vehicle when the motor is not in use, and to this latter class of devices my present invention belongs, one of the objects contemplated thereby being the provision of new and improved means whereby the motor may be rendered independent of the manually or otherwise operated mechanism and may at the will of the operator be instantly thrown into and out of engagement with the driven part of the vehicle and be rigidly held in such engaging and disengaging relation thereto, so that the vehicle may, when desired, be run by gravity or by the agency of the manually or otherwise operated means without the loss of power and speed incident to the dragging or braking effect resulting from the idle operation of the parts of the motor; and my invention further contemplates a novel and advantageous arrangement of the component parts of the motor whereby the manipulation of a single part or element, as a hand-wheel, will automatically and simultaneously set into coöperative action all the interdependent parts and elements of the complete motor.

To these ends my invention consists in the parts and combinations of parts, as hereinafter described and claimed and as illustrated in the accompanying drawings, in which—

Figure 1 is a side elevation of a bicycle having my improved motor applied thereto, the motor being shown in operative relation to the rear wheel of the bicycle. Fig. 2 is a similar view of the opposite side of the bicycle, the motor being there shown in inoperative relation to the rear wheel of the bicycle. Fig. 3 is a rear view, enlarged, of the bicycle and motor as shown in Fig. 1, certain parts of the bicycle being omitted for the sake of clearness. Fig. 4 is an enlarged view of one side of the motor, showing the parts of the engine in the positions they occupy a half stroke in advance of the positions shown in Figs. 1, 2, and 3. Fig. 5 is an enlarged detail view, broken away, of one of the cylinders, showing the preferred forms of inlet and exhaust valves. Fig. 6 is an enlarged detail, broken away, in longitudinal vertical section, on line 2 2 of Fig. 7, of the preferred mechanism for putting and holding the engine in operative relation to the driving-wheel of the bicycle. Fig. 7 is an enlarged detail, in transverse vertical section, on line 1 1 of Fig. 6, of the mechanism shown in the latter figure; and Fig. 8 is an enlarged detail in perspective of the forked lever forming part of the connection between the engine and the vehicle.

Similar letters refer to similar parts throughout the several views.

Referring to Figs. 1 and 2, A represents a bicycle of the ordinary type. To the upper rear fork of the frame and slightly to the rear thereof are secured bed-plates B and B', these bed-plates being held in rigid relation to the forks by means of arms or brackets *a b* and *a' b'*, which latter are secured at one end to the bed-plates and at their other ends clamp the upper and lower rear forks of the bicycle. It is essential to the easy operation of the mechanism that the bed-plates B B' be held in strictly parallel relation to each other and to the vertical longitudinal plane of the bicycle, and to this end they are rigidly secured together at the top by a cross-bar $c$, Fig. 3, which latter may form a lateral extension of a gear shield or guard C, hereinafter described. For purposes of greater rigidity a bracket or brace $c'$ may be interposed between the cross-bar $c$ and the seat-post collar, and such bracket or brace will resist both a lateral and a longitudinal yielding of the bed-plates B B' and the mechanism which they carry.

Upon the bed-plates B B' engine-cylinders D E and D' E' are mounted, respectively. These cylinders may be fixedly secured in parallel relation to the bed-plates by means of yokes $x\ y$ and $x'\ y'$ or by any other desired means. Each pair of cylinders D E and D' E' is disposed in tandem relation, as shown, the pistons $d\ e$ of the cylinders D E being connected by a common piston-rod $f$ and the pistons $d'\ e'$ of the cylinders D' E' being similarly connected by a common piston-rod $f'$. Cross-heads $g$ and $g'$ are secured at their centers on the piston-rods $f$ and $f'$, respectively, and from the extremities of these cross-heads extend connecting-rods $h\ h$ and $h'\ h'$, respectively, the latter terminating at some distance above the cylinders D and D' in cross-heads $i$ and $i'$, respectively. The connecting-rods $h\ h$ and $h'\ h'$ lie alongside of and parallel with the cylinders D and D', as shown, and are guided and supported in their reciprocating movements by lugs $j$ and $j'$, formed on the bed-plates B and B'. Mounted in suitable bearings in the upper part of the bed-plates B and B' is a horizontal shaft $m$, which forms the driving-shaft of the engine and the extremities of which, at some distance above the outer surfaces of the bed-plates B B', carry crank-arms $l$ and $l'$. Pitmen $k$ and $k'$ connect the outer ends of these crank-arms with the cross-heads $i$ and $i'$, respectively.

Rigidly keyed upon the driving-shaft $m$ at a point adjacent the inner or under face of the bed-plate B is a toothed wheel or disk F. This wheel F is in constant engagement with a smaller toothed wheel or disk G, fixedly mounted on one end of a shaft $n$, the latter shaft being rotatably mounted in the extremities of a forked lever H, as best shown in Figs. 2 and 3, and rigidly keyed upon this shaft $n$ is a grooved wheel I, adapted to have frictional contact with the periphery of the rear wheel of the bicycle, as shown in Figs. 1 and 3, when the motor is operated to propel the bicycle. The forked lever H, which is shown in detail perspective in Fig. 8, is pivoted to turn freely upon the driving-shaft $m$ and in its operative position extends forward, its fork straddling the rear fork and the center brace of the bicycle-frame and its single arm terminating in a cross-head $o$. The cross-head $o$ in the operation of starting and stopping the engine is adapted to reciprocate in a curved and slotted guide J, which is adjustably secured, as shown, between the upper horizontal and the lower oblique braces of the bicycle-frame.

The means for securing guide J in place and for effecting the reciprocation of cross-head $o$ thereupon are as follows, reference being had particularly to Figs. 6 and 7, in which said parts are shown in enlarged detail: At its upper end guide J terminates in a rectangular plate J', concaved longitudinally, as at $j^2$, to fit the horizontal bar of the bicycle-frame and securely clamped to the latter by means of a similar longitudinally-concaved plate $J^2$ and bolts $j^3$. An internally threaded bore $k^2$, formed in the lower end of guide J, receives a threaded bolt $l^2$, the latter being pivoted at its head on a pin $m'$, which pin is carried by a pair of clamps K' K$^2$, similar to clamps J' J$^2$, and secured to the lower oblique brace of the bicycle-frame by bolts $k^3$. By this means the guide J may readily be secured in bicycle-frames of varying size and angularity. Journaled in the plates or clamps J' J$^2$, as shown, is a short horizontal shaft $p$, carrying at one end a hand-wheel K and at the other an eccentric $q$, the latter being connected by means of an eccentric-strap $q'$ and rod $q^2$ with a pin $r$, secured laterally in the lever H near the cross-head $o$. On the inner face of hand-wheel K is formed a ring of ratchet-teeth $n'$, and on a short shaft $n^2$, journaled in the clamps J' J$^2$, near one end thereof, as shown, is splined a pawl or detent $n^3$ and a heel-piece $n^4$.

From the mechanism above described it is plain that the cross-head $o$ can be readily raised or lowered in the slotted guide J to throw the friction-wheel I into and out of engagement with the driving-wheel of the bicycle by simply turning the hand-wheel K in one direction or the other and can be retained in any desired position by means of the pawl-and-ratchet device.

L is an oil-receptacle secured, preferably, to the upper horizontal bar of the frame by means of clamps $l^3$ and having an orifice $l^4$, closed by a stopper $l^5$, whereby it may be readily filled. It may here be stated that I employ as fuel any suitable light hydrocarbon oil, gasolene or kerosene being preferred. A short pipe $m^2$, terminating in a stop-cock $m^3$, taps the receptacle L at or near its bottom, and from the stop-cock oil-pipes $m^4$ and $m^5$ extend, one on each side of the frame, to the inlet-valves of the cylinders E and E', respectively. These pipes $m^4\ m^5$ are secured to the upper rear fork of the frame by clamps $o'\ o^2$ and have short branch pipes $m^6\ m^7$, connecting them with the inlet-valves of cylinders D and D'.

In Fig. 5 is shown in an enlarged sectional detail the preferred form of inlet and exhaust valves for the cylinders. In this view $a^2$ represents the inlet-valve casing, which is cored annularly, as at $a^3$, to admit oil or other fuel entering through pipe $m^6$ at the point indicated by dotted lines in said figure. The lower end of valve-casing $a^2$ terminates in a valve-seat $a^4$, and the latter is connected with the annular core $a^3$ by numerous small ducts $a^5$. The valve $a^6$ is normally held closed against the valve-seat by a light spring $a^7$, surrounding the valve-stem, as shown, the latter being guided in perforated plates $a^8$. A perforated cap $a^9$ covers the upper end of the valve-casing, and between the latter and the upper plate $a^8$ is inserted a porous fibrous material $a^{10}$ to strain the air of impurities as it enters the cylinder through the valve. A pin $a^{11}$ in the end of the valve-stem prevents danger of the valve being accidentally drawn into the cylinder and causing damage. The casing of the exhaust-valve is represented by $b^2$, and it terminates at its lower end in a valve-seat $b^3$, against which the valve $b^4$ is normally held pressed by a spring $b^5$. The stem of this valve is guided in the cap $b^6$, which covers the upper end of the valve-casing, and in a spider $b^7$. The spring $b^5$ is stiff enough to hold the valve closed at all times except when it is forced open by the valve-actuating mechanism hereinafter described. The valve-casing is provided with numerous openings $b^8$, affording free access from its interior to the atmosphere. A pin $b^9$ in the end of the valve-stem performs the same service as the pin $a^{11}$ in the stem of the inlet-valve. The valve-casings $a^2$ and $b^2$ may be secured in the cylinder-head by screws $w$ or in any other desired manner. In operation on the suction stroke of the piston air is drawn into the cylinder through the perforated cap $a^9$, porous material $a^{10}$, and perforated guide-plates $a^8$, and oil or oil-vapor is simultaneously induced through pipe $m^6$, core $a^3$, and ducts $a^5$. The air and oil-vapor fill the cylinder with a highly-explosive combustible mixture, which on the return stroke of the piston is compressed and then fired by an electric spark passed between the terminals $v$ and $v'$, as hereinafter described. This produces the working stroke of the piston, and on the next return stroke the exhaust-valve is automatically opened and the products of combustion are expelled past the exhaust-valve $b^4$ and out through openings $b^8$ to the atmosphere.

I will now describe the mechanism I prefer to employ for actuating the exhaust-valves of the cylinders. On the driving-shaft $m$, adjacent the outer faces of the bed-plates B B', are small gears $s$ and $s'$. These gears mesh with gears $s^2$ and $s^3$, respectively secured on short shafts in the bed-plates and having each twice as many teeth as gears $s$ and $s'$. On the face of gear $s^2$ are superimposed cams $t$ and $t'$, and on the face of gear $s^3$ are similar cams $t^2$ and $t^3$. These cams $t$, $t'$, $t^3$, and $t^2$ are so disposed on the gears $s^2$ and $s^3$, as shown, that they will actuate the exhaust-valves of the four cylinders D, E, E', and D', respectively, in turn, in the order stated, during each complete revolution of the said gears, as will be more clearly set forth in the description of the operation of the invention. The cams actuate the stems of the exhaust-valves through the agency of longitudinally-sliding rods $u$, $u'$, $u^2$, and $u^3$, having bearings in the lugs $j$ and $j'$ and provided with returning-springs $u^4$, $u^5$, $u^6$, and $u^7$, respectively. These rods have lateral extensions, as shown, to engage the peripheries of the cams and the stems of the exhaust-valves. In Figs. 2 and 3 the rod $u^2$ is shown depressed by its cam $t^2$ to open the exhaust-valve of cylinder D', and in Fig. 4 rod $u$ is shown at the initial point of its engagement by cam $t$ to effect the exhaust of cylinder D. Each of the cams engages its respective valve-actuating rod just long enough to permit the complete expulsion of the burned products of combustion during the entire expelling stroke of the piston.

Any suitable and convenient igniter may be employed in connection with the engine hereinabove described; but in view of the fact that in a motor of this character designed to be applied to the frame of a vehicle such as the modern bicycle all the parts must of necessity be very compactly arranged, I have devised an igniting mechanism especially adapted to coöperate conveniently with the particular structure and arrangement of the other coöperating parts of the engine.

M represents an electric battery or other suitable source of electricity secured to the head of the bicycle-frame, as shown. From this extend main positive and negative wires $c^2$ and $d^2$, respectively, which are preferably carried along the upper horizontal bar of the frame.

N and N' represent gears similar to gears $s^2$ and $s^3$, already described, and mounted on short shafts in bed-plates B B', directly above and engaging with gears $s$ and $s'$. These gears N and N', like the gears $s^2$ and $s^3$, perform exactly one revolution during two revolutions of gears $s$ and $s'$. Gear N carries a cam-finger $e^2$, having an insulated tip, and gear N' is provided with a similar cam-finger $e^3$. On the bed-plate B, in proximity to the gear N, are secured two pairs of spring-contacts $f^2 f^3$ and $f^4 f^5$, so arranged that the cam-finger $e^2$ will in its revolution press the contacts $f^2$ and $f^4$ into engagement with their respective contacts $f^3$ and $f^5$ to close the circuits and produce at the proper time an electric spark between the electrodes $v$ $v'$ and $v^2$ $v^3$ in the working ends of cylinders D and E. Bed-plate B' is provided with two pairs of spring-contacts $g^2 g^3$ and $g^4 g^5$, arranged with reference to their actuating cam-finger $e^3$ and the electrodes $v^6 v^7$ and $v^4 v^5$ of cylinders E' and D' precisely like the contacts $f^2 f^3$ and $f^4 f^5$ above described. At the point where the horizontal rod joins the center brace of the frame the main positive wire $c^2$ is divided into two branches $c^3$ and $c^4$, the former leading down onto the bed-plate B and the latter onto bed-plate B'. The main negative wire $d^2$ is similarly split into two branches $d^3$ and $d^4$, leading down onto bed-plates B and B', respectively. Each of these four branch wires $c^3$, $c^4$, $d^3$, and $d^4$ is again split and connected with the spring-contacts and with the electrodes as follows: $c^3$, by its two branches $c^5$ $c^6$, connects with contacts $f^3$ and $f^4$, respectively; $d^3$, by its two branches $d^5$ $d^6$, connects directly with the negative electrodes $v'$ $v^3$, respectively, and the connections are completed by wire $c^7$ between contact $f^5$ and positive electrode $v^2$ and wire $c^8$ between contact $f^2$ and positive electrode $v$. These connections are most clearly shown in Fig. 4. On the other side of the engine wire $c^4$, by its two branches $c^9$ $c^{10}$, connects with contacts $g^2$ and $g^5$, respectively; $d^4$, by its two branches $d^7$ $d^8$, connects directly with the negative electrodes $v^5$ $v^7$, respectively, and the connections are completed by wire $c^{11}$ between contact $g^3$ and positive electrode $v^6$ and wire $c^{12}$ between contact $g^4$ and positive electrode $v^4$.

From the above connections it will be evident that as the cam-fingers $e^2$ and $e^3$ revolve, closing the contacts $f^2$ $f^3$ $f^4$ $f^5$, $g^2$ $g^3$, and $g^4$ $g^5$ in turn, in the order named, if the electric circuit be otherwise complete sparks will be caused to pass in turn between the electrodes $v$ $v'$ $v^2$ $v^3$ $v^6$ $v^7$ and $v^4$ $v^5$ in the cylinders D, E, E', and D', respectively.

Referring to Fig. 6, I will now explain a device I have devised to automatically close the main electric circuit when the motor is started in operation and interrupt the circuit when the motor is thrown out of operation. In said figure, $h^2$ $h^3$ represent two insulated metallic conductors lying between the clamping-plates J' and J². These conductors are connected at their outer ends to the separated ends of the main-circuit wire $c^2$ and at their inner ends abut a metallic ring formed of two segments $h^4$ $h^5$, insulated from each other, as shown, and also insulated from the shaft $p$, which they surround. When the engine is placed in operative relation to the bicycle, as shown in Figs. 1 and 3, the parts $h^2$, $h^3$, $h^4$, and $h^5$ will occupy the relative positions shown in Fig. 6 and the current will pass from left to right by way of wire $c^2$, conductor $h^2$, segment $h^4$, conductor $h^3$, and wire $c^2$. When, however, the engine is thrown out of operation by turning hand-wheel K in a direction to lower the cross-head $o$, and thereby raise friction-wheel I out of engagement with the driving-wheel, such movement will rotate the shaft $p$ sufficiently to bring segment $h^5$ into engagement with conductor $h^3$, conductor $h^2$ still remaining in engagement with segment $h^4$. As segments $h^4$ and $h^5$ are insulated from each other, it is obvious no current can pass. This device will prevent the engine from racing when freed from its load, and also prevents waste of current in case the engine should happen to stop with one of the cam-fingers $e^2$ or $e^3$ closing the circuit through one of the four pairs of electrodes.

In order to still further simplify the operations of starting and stopping the engine, I have devised means, as hereinafter described, for automatically starting the flow of fuel to the cylinders simultaneously with the application of the friction-wheel I to the driving-wheel. These means consist of a crank-arm $p'$ on the shaft of the stop-cock $m^3$ and an adjustable rod $p^2$, connecting the outer end of arm $p'$ with the lever H. When the parts are in the position shown in Fig. 2, the cock $m^3$ is closed and no fuel can pass to the engine; but when the wheel I is forced into frictional engagement with the driving-wheel by the actuation of lever H the cock $m^3$ is automatically opened and fuel at once begins to flow to the cylinders. Said stop-cock may, however, be actuated independently by hand, if preferred. It will thus be seen that by the actuation of a single element (as hand-wheel K) located within convenient reach of the rider the three important operations of, first, throwing the engine into operative engagement with the vehicle; second, closing the electric circuit of the igniter, and, third, admitting fuel to the engine-cylinders are simultaneously performed, and by the reverse actuation of the same element the reverse of these three operations is effected. This forms an important feature of my present invention.

From the above description of the construction of my improved motor its mode of operation will be readily understood by those skilled in the art to which it relates. With the friction-wheel I out of engagement with the driving-wheel, as shown in Fig. 2, the rider mounts the machine and starts it by the pedal mechanism in the usual way. This start, it will be noticed, does not have to be made against the drag caused by the idle operation of the parts of the motor, as is the case in most motor-vehicles of this class with which I am acquainted. When a good momentum has been obtained, the rider turns hand-wheel K in the direction indicated by the arrow in Figs. 2 and 6. This movement of hand-wheel K through the connections hereinbefore described forces wheel I into frictional engagement with the tire or periphery of the driving-wheel and at the same time closes the igniter-circuit and opens the fuel-cock. The momentum of the rider and vehicle applied to the wheel I through the driving-wheel starts the parts of the engine into operation and the cylinders begin to draw in charges of mixed air and oil-vapor. Assuming now the parts to be in the positions shown in Figs. 1, 2, and 3, and further assuming wheel I to be in operative engagement with the driving-wheel in Fig. 2, I will explain the operations taking place in the four cylinders D, E, E', and D'. The piston in cylinder D is half-way through its working stroke, its previously-compressed charge having been fired at the commencement of its stroke through the closing of its igniter-circuit by cam-finger $e^2$ closing contacts $f^2 f^3$. The piston in cylinder E is compressing a charge drawn in on the previous upstroke. By the time it completes its compressing stroke its igniter-circuit will be closed and its charge fired by cam-finger $e^2$ closing contacts $f^4 f^5$, and simultaneously cam $t$ will open the exhaust-valve of cylinder D, all as shown in Fig. 4, which represents cylinders D and E and their connected parts at this point of their operations. The piston in cylinder E' is drawing in a charge and the piston in cylinder D' is half-way through its exhaust-stroke, its exhaust-valve being held open by cam $t^2$ acting on rod $u^2$. Thus it will be seen that the pistons in cylinders D, E, E', and D' perform working strokes in turn in the order named, each stroke effecting a half-revolution of the shaft $m$ and every half-revolution of said shaft being performed under a positive impulse from one of the four pistons. The necessity of a heavy balance-wheel (common in this "Otto" or four-cycle type of engine, especially where only one cylinder is employed) is thus done away with, though it may be noted that the momentum of the machine and its rider will have the effect of a balance-wheel in steadying the running of the engine. The multiplying-gears F and G will enable a comparatively slow operation of the engines to produce a rapid revolution of the driving-wheel of the machine and a high speed.

I construct the cylinders of the engine of as thin light material (preferably brass) as is consistent with safety, and this, taken with the fact that they are constantly exposed in a position to receive the maximum cooling effect of the breeze created by locomotion, obviates the necessity of the usual water-jacket for cooling purposes. The inner ends of the cylinders (opposite the working ends) are constantly open to the atmosphere through apertures $r'$ in the cylinder-heads. (See Fig. 3.)

Referring once more to Fig. 5, it will be noticed that the casing $a^2$ of the inlet-valve projects some little distance down into the cylinder. By this arrangement the heat of the burned products of combustion is made more effective to vaporize the hydrocarbon fuel in the annular core $a^3$.

The concave periphery of the friction-wheel I is preferably faced with rubber or some similar material to increase its frictional hold on the tire of the driving-wheel.

The gear shield or guard C, which, as before stated, forms, with the cross-bar $c$ a rigid brace between the upper ends of the bed-plates B and B', is designed to protect the clothes of the rider from injury, and may, if found desirable, be extended to more completely cover the working parts of the engine than as shown.

The friction-wheel I being under a considerable strain when in its working position, Figs. 1 and 3, it is essential that it should be firmly held, especially against lateral yielding or displacement, while capable of adjustment in a vertical plane. To this end the curved and slotted guide J, rigidly held at both ends and having the cross-head $o$ on the extremity of the forked lever H working therein, is found to be effective. Inasmuch as the lever H is held rigidly against lateral yielding at both its fulcrum (on the shaft $m$) and at the extremity of its long arm, (cross-head $o$,) practically no possibility of lateral vibration of the short arm or of the wheel I, journaled therein, remains, and the wheel I will run true and steady against the tire of the driving-wheel.

In the application of my invention to a vehicle having more than two wheels, as a tricycle or four-wheeled carriage, the bed-plates B and B' will be secured on opposite sides of the frame of the vehicle in such position as to bring the disk or wheel I over one of the rear wheels, or, as is obvious, two friction-wheels may be employed, they being fast on a common shaft and each engaging one of the rear wheels of the vehicle, while the mechanism for actuating the lever H will be located at any suitable point on the forward part of the vehicle-frame.

I do not wish to be understood as limiting my invention to the precise details and arrangement of mechanism shown and described. Numerous modifications in structure and arrangement of parts may be made within the field of mechanical skill without departing from the spirit of my invention.

Having thus described my invention and illustrated the preferred means for carrying the same into effect, what I claim as new, and desire to secure by Letters Patent, is—

1. In a motor for bicycles and similar vehicles, the combination with a multiple-cylinder explosive-engine adapted to be secured to the frame of a vehicle of a forked lever fulcrumed on the driving-shaft of the engine, a friction-wheel journaled in and carried by said forked lever, driving connections between said driving-shaft and said friction-wheel, an oil-receptacle adapted to be secured to the frame of the vehicle, pipes leading from said oil-receptacle to the inlet-valves of the cylinders, a cock in said pipes, connections intermediate said cock and the forked lever, and means connected with said forked lever whereby said friction-wheel may be pressed into contact with a wheel of the vehicle or removed therefrom, and simultaneously the flow of oil to the cylinders may be opened or closed, substantially as described.

2. In a motor for bicycles and similar vehicles, the combination with an explosive-engine adapted to be secured to the frame of the vehicle of a forked lever fulcrumed on the driving-shaft of the engine, a friction-wheel journaled in and carried by said forked lever, driving connections between said driving-shaft and said friction-wheel, a source of electricity designed to be carried on the vehicle, an electric circuit intermediate said source of electricity and the igniter mechanism of the engine, a circuit making and breaking device located in said circuit, and means connected with said forked lever and with said circuit making and breaking device, whereby said friction-wheel may be pressed into contact with a wheel of a vehicle or removed therefrom, and simultaneously the electric circuit of the igniter may be closed or opened, substantially as described.

3. In a motor for bicycles and similar vehicles, the combination with a multiple-cylinder explosive-engine adapted to be secured to the frame of the vehicle, of a forked lever fulcrumed on the driving-shaft of the engine, a friction-wheel journaled in and carried by said forked lever, driving connections between said driving-shaft and said friction-wheel, an oil-receptacle adapted to be secured to the frame of the vehicle, pipes leading from said oil-receptacle to the inlet-valves of the engine-cylinders, a cock in said pipes, connections intermediate said cock and the forked lever, a source of electricity designed to be carried on the vehicle, an electric circuit intermediate said source of electricity and the igniter mechanism of the engine, a circuit making and breaking device located in said circuit, and means connected with said forked lever and with said circuit making and breaking device, whereby the three operations of putting the friction-wheel into engagement with the driving-wheel, opening the flow of oil to the cylinders, and closing the igniter-circuit may be simultaneously performed by a single actuation of said means in one direction, and the reverse of said operations may be simultaneously effected by a single actuation of said means in the reverse direction, substantially as described.

4. In a motor for bicycles and similar vehicles, the combination with an explosive-engine adapted to be secured to the frame of the vehicle of a forked lever fulcrumed on the driving-shaft of the engine, a friction-wheel journaled in and carried by said forked lever, driving connections between said driving-shaft and said friction-wheel, a curved and slotted guide adapted to be adjustably secured to the frame of the vehicle and coöperating with the forwardly-extending end of the forked lever, and manually-operated means for actuating the latter in the guide to control the engagement of the friction-wheel with the driving-wheel of the vehicle, substantially as described.

5. In a motor for bicycles and similar vehicles, the combination with an explosive-engine adapted to be secured to the frame of the vehicle of a forked lever fulcrumed on the driving-shaft of the engine, a friction-wheel journaled in and carried by said forked lever, driving connections between said driving-shaft and said friction-wheel, a curved and slotted guide adapted to be adjustably secured to the frame of the vehicle and coöperating with the forwardly-extending end of the forked lever, and means for actuating the latter in the guide, said means comprising a short shaft journaled above said guide, a hand-wheel provided with a detent mechanism on one end of said short shaft, and actuating connections between the other end of said short shaft and the forwardly-extending arm of the forked lever, all arranged and coöperating substantially as set forth.

6. In a motor for bicycles and similar vehicles, the combination with a pair of bed-plates adapted to be secured to the frame of the vehicle, one on each side thereof, and a pair of operatively-equipped engine-cylinders arranged tandem on each bed-plate, of a driving-shaft journaled transversely in the bed-plates and operatively connected with the engine-cylinders, a forked lever fulcrumed on said driving-shaft, a friction-wheel journaled in and carried by said forked lever, driving connections between said driving-shaft and said friction-wheel, and manually-operated means connected with said forked lever whereby said friction-wheel may be thrown into and out of contact with the periphery of a wheel of the vehicle, substantially as described.

7. In a motor for bicycles and similar vehicles, the combination with a pair of bed-plates adapted to be secured to the frame of the vehicle, one on each side thereof, and a pair of operatively-equipped engine-cylinders arranged tandem on each bed-plate, of a driving-shaft journaled transversely in the bed-plates and operatively connected with the engine-cylinders, a forked lever fulcrumed on said driving-shaft, a friction-wheel journaled in and carried by said forked lever, a toothed gear fixed on the driving-shaft, another toothed gear fixed on the shaft of the friction-wheel and in engagement with said first-named gear, and manually-operated means connected with said forked lever whereby said friction-wheel may be thrown into and out of contact with the periphery of the wheel of the vehicle, substantially as described.

8. In a motor for bicycles and similar vehicles, the combination with a pair of bed-plates adapted to be secured to the frame of the vehicle, one on each side thereof, and a pair of engine-cylinders arranged tandem on each bed-plate, of a driving-shaft journaled transversely in the bed-plates and operatively connected with the engine-cylinders, a forked lever fulcrumed on said driving-shaft, a friction-wheel journaled in and carried by said forked lever, driving connections between said driving-shaft and said friction-wheel, igniting and valve-actuating mechanism constructed and arranged to produce successive explosions in the four cylinders of the engine, whereby a positive impulse is imparted to the driving-shaft through every half-rotation thereof, and manually-operated means connected with said forked lever whereby said friction-wheel may be pressed into contact with the periphery of the wheel of the vehicle and removed therefrom, substantially as described.

In testimony that I claim the foregoing as my invention I affix my signature, in the presence of two witnesses, this 8th day of April, 1899.

SAMUEL N. POND.

Witnesses:
F. B. TOWNSEND,
ROBERT N. HOLT.